United States Patent
Zhang et al.

(10) Patent No.: US 9,990,652 B2
(45) Date of Patent: Jun. 5, 2018

(54) TARGETING SOCIAL ADVERTISING TO FRIENDS OF USERS WHO HAVE INTERACTED WITH AN OBJECT ASSOCIATED WITH THE ADVERTISING

(75) Inventors: Junliang Zhang, San Jose, CA (US); Gang Wu, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 1387 days.

(21) Appl. No.: 12/968,786

(22) Filed: Dec. 15, 2010

(65) Prior Publication Data
US 2012/0158501 A1  Jun. 21, 2012

(51) Int. Cl.
*G06Q 30/02* (2012.01)
(52) U.S. Cl.
CPC ................................ *G06Q 30/0255* (2013.01)
(58) Field of Classification Search
None
See application file for complete search history.

(56) References Cited

U.S. PATENT DOCUMENTS

| | | |
|---|---|---|
| 5,987,440 A | 11/1999 | O'Neil et al. |
| 6,134,532 A | 10/2000 | Lazarus et al. |
| 6,691,155 B2 | 2/2004 | Gottfried |
| 7,523,478 B2 | 4/2009 | Blackketter et al. |
| 7,752,552 B2 | 7/2010 | Pennington et al. |
| 7,818,392 B1 | 10/2010 | Martino et al. |
| 7,844,604 B2 | 11/2010 | Baio et al. |
| 7,853,622 B1 | 12/2010 | Baluja et al. |
| 7,958,005 B2 | 6/2011 | Dangaltchev |
| 7,958,453 B1 | 6/2011 | Taing |

(Continued)

FOREIGN PATENT DOCUMENTS

| | | |
|---|---|---|
| CA | 2 672 735 | 6/2008 |
| CN | 101802787 A | 8/2010 |

(Continued)

OTHER PUBLICATIONS

PCT International Search Report and Written Opinion, PCT Application No. PCT/US2011/061545, Mar. 27, 2012, six pages.

(Continued)

*Primary Examiner* — Colleen A Hoar
(74) *Attorney, Agent, or Firm* — Fenwick & West LLP (57) ABSTRACT

A viewing user is provided with social advertisements when accessing content associated with a social networking system. A social advertisement can include a candidate advertisement and an associated social story. Candidate advertisements are advertisements provided by one or more advertisers, where the advertisements each specify a relationship between their advertising content and one or more social networking objects. To identify social stories associated with the candidate advertisements, the social networking system identifies other users associated with the viewing user who has interacted with social networking objects that are related to candidate advertisements. Additionally, the social networking system identifies the one or more interactions between the other users and the one or more objects as a social story. The social networking system selects a candidate advertisement and combines it with a social story to create a social advertisement and sends the social advertisement for display to the viewing user.

44 Claims, 3 Drawing Sheets

(56) References Cited

U.S. PATENT DOCUMENTS

| | | |
|---|---|---|
| 8,161,083 B1 | 4/2012 | Wood et al. |
| 8,166,028 B1 | 4/2012 | Reynar et al. |
| 8,166,069 B2 | 4/2012 | Sample et al. |
| 8,676,894 B2 | 3/2014 | Schoen et al. |
| 8,892,650 B2 | 11/2014 | Li et al. |
| 9,123,079 B2 | 9/2015 | Zigoris et al. |
| 9,135,631 B2 | 9/2015 | Mitchell et al. |
| 2002/0029186 A1 | 3/2002 | Roth et al. |
| 2002/0070961 A1 | 6/2002 | Xu et al. |
| 2002/0077872 A1 | 6/2002 | Lancos et al. |
| 2002/0087352 A1 | 7/2002 | Armstrong et al. |
| 2002/0161838 A1 | 10/2002 | Pickover et al. |
| 2002/0184088 A1 | 12/2002 | Rosenberg |
| 2003/0046161 A1 | 3/2003 | Kamangar et al. |
| 2003/0093798 A1 | 5/2003 | Rogerson |
| 2003/0137531 A1 | 7/2003 | Katinsky et al. |
| 2003/0145042 A1 | 7/2003 | Berry et al. |
| 2003/0149580 A1 | 8/2003 | Moores et al. |
| 2003/0163372 A1 | 8/2003 | Kolsy |
| 2003/0187739 A1 | 10/2003 | Powers |
| 2004/0015397 A1 | 1/2004 | Barry et al. |
| 2004/0044571 A1 | 3/2004 | Bronnimann et al. |
| 2004/0193488 A1 | 9/2004 | Khoo et al. |
| 2004/0193691 A1 | 9/2004 | Chang |
| 2004/0210565 A1 | 10/2004 | Lu et al. |
| 2004/0249709 A1 | 12/2004 | Donovan et al. |
| 2005/0065806 A1 | 3/2005 | Hank |
| 2005/0096980 A1 | 5/2005 | Koningstein |
| 2005/0097204 A1 | 5/2005 | Horowitz et al. |
| 2005/0131992 A1 | 6/2005 | Goldstein et al. |
| 2005/0137958 A1 | 6/2005 | Huber et al. |
| 2005/0144065 A1 | 6/2005 | Calabria et al. |
| 2005/0149397 A1 | 7/2005 | Morgenstern et al. |
| 2005/0171955 A1 | 8/2005 | Hull et al. |
| 2005/0183133 A1 | 8/2005 | Kelly |
| 2005/0197894 A1 | 9/2005 | Fairbanks et al. |
| 2005/0216300 A1 | 9/2005 | Appelman et al. |
| 2005/0246651 A1 | 11/2005 | Krzanowski |
| 2005/0289131 A1 | 12/2005 | Aenlle et al. |
| 2006/0041509 A1 | 2/2006 | Koerber |
| 2006/0042483 A1 | 3/2006 | Work et al. |
| 2006/0059147 A1 | 3/2006 | Weiss et al. |
| 2006/0064346 A1 | 3/2006 | Steenstra et al. |
| 2006/0085408 A1 | 4/2006 | Morsa |
| 2006/0101341 A1 | 5/2006 | Kelly et al. |
| 2006/0184579 A1 | 8/2006 | Mills et al. |
| 2006/0190281 A1 | 8/2006 | Kott et al. |
| 2006/0215988 A1 | 9/2006 | Tol et al. |
| 2006/0230061 A1 | 10/2006 | Sample et al. |
| 2006/0248573 A1 | 11/2006 | Pannu et al. |
| 2006/0253584 A1 | 11/2006 | Dixon et al. |
| 2006/0265283 A1 | 11/2006 | Gorodyansky |
| 2006/0271953 A1 | 11/2006 | Jacoby et al. |
| 2006/0271961 A1 | 11/2006 | Jacoby et al. |
| 2006/0271997 A1 | 11/2006 | Jacoby et al. |
| 2006/0277102 A1 | 12/2006 | Agliozzo |
| 2007/0006277 A1 | 1/2007 | Mills et al. |
| 2007/0016553 A1 | 1/2007 | Dumais et al. |
| 2007/0027773 A1 | 2/2007 | Lee |
| 2007/0038508 A1 | 2/2007 | Jain et al. |
| 2007/0043766 A1 | 2/2007 | Nicholas et al. |
| 2007/0073581 A1 | 3/2007 | Kempe et al. |
| 2007/0078718 A1 | 4/2007 | Gorodyansky |
| 2007/0101368 A1 | 5/2007 | Jacoby et al. |
| 2007/0106627 A1 | 5/2007 | Srivastava et al. |
| 2007/0121843 A1 | 5/2007 | Atazky et al. |
| 2007/0150537 A1 | 6/2007 | Graham |
| 2007/0150603 A1 | 6/2007 | Crull et al. |
| 2007/0157108 A1 | 7/2007 | Bishop |
| 2007/0179792 A1 | 8/2007 | Kramer |
| 2007/0204308 A1 | 8/2007 | Nicholas et al. |
| 2007/0220575 A1 | 9/2007 | Cooper et al. |
| 2007/0239517 A1 | 10/2007 | Chung et al. |
| 2007/0239535 A1 | 10/2007 | Koran et al. |
| 2007/0245399 A1 | 10/2007 | Espelien |
| 2007/0252004 A1 | 11/2007 | Shiraki et al. |
| 2007/0258656 A1 | 11/2007 | Aarabi |
| 2007/0260520 A1 | 11/2007 | Jha et al. |
| 2007/0265090 A1 | 11/2007 | Barsness et al. |
| 2007/0266097 A1 | 11/2007 | Harik et al. |
| 2007/0299857 A1 | 12/2007 | Gworzdz et al. |
| 2007/0300064 A1 | 12/2007 | Isaacs et al. |
| 2008/0004959 A1 | 1/2008 | Tunguz-Zawislak et al. |
| 2008/0005282 A1 | 1/2008 | Gaedcke |
| 2008/0010144 A1 | 1/2008 | Chatwin et al. |
| 2008/0021729 A1 | 1/2008 | Calabria |
| 2008/0033810 A1 | 2/2008 | Chu |
| 2008/0040475 A1 | 2/2008 | Bosworth et al. |
| 2008/0040673 A1 | 2/2008 | Zuckerberg et al. |
| 2008/0059300 A1 | 3/2008 | Hamoui |
| 2008/0059308 A1 | 3/2008 | Gerken |
| 2008/0065405 A1 | 3/2008 | Adelman et al. |
| 2008/0065486 A1 | 3/2008 | Vincent et al. |
| 2008/0070209 A1 | 3/2008 | Zhuang et al. |
| 2008/0077595 A1 | 3/2008 | Leebow |
| 2008/0082413 A1 | 4/2008 | Madhavan |
| 2008/0082414 A1 | 4/2008 | Madhavan |
| 2008/0086319 A1 | 4/2008 | Berger |
| 2008/0086379 A1 | 4/2008 | Dion et al. |
| 2008/0091684 A1 | 4/2008 | Ellis et al. |
| 2008/0097988 A1 | 4/2008 | Broder et al. |
| 2008/0103913 A1 | 5/2008 | Leach et al. |
| 2008/0104225 A1 | 5/2008 | Zhang et al. |
| 2008/0109285 A1 | 5/2008 | Reuther et al. |
| 2008/0120183 A1 | 5/2008 | Park |
| 2008/0126476 A1 | 5/2008 | Nicholas et al. |
| 2008/0126949 A1 | 5/2008 | Sharma |
| 2008/0133364 A1 | 6/2008 | Ullah |
| 2008/0133495 A1 | 6/2008 | Fischer |
| 2008/0133756 A1 | 6/2008 | Taylor |
| 2008/0134054 A1 | 6/2008 | Clark et al. |
| 2008/0140506 A1 | 6/2008 | Christianson et al. |
| 2008/0147498 A1 | 6/2008 | Chao et al. |
| 2008/0147659 A1 | 6/2008 | Chen et al. |
| 2008/0162260 A1 | 7/2008 | Rohan et al. |
| 2008/0172344 A1 | 7/2008 | Eager et al. |
| 2008/0177708 A1 | 7/2008 | Ayyar et al. |
| 2008/0189169 A1 | 8/2008 | Turpin et al. |
| 2008/0195428 A1 | 8/2008 | O'Sullivan |
| 2008/0215581 A1 | 9/2008 | Messing et al. |
| 2008/0215675 A1 | 9/2008 | Kaminitz et al. |
| 2008/0228537 A1 | 9/2008 | Monfried et al. |
| 2008/0250450 A1 | 10/2008 | Larner et al. |
| 2008/0267443 A1 | 10/2008 | Aarabi |
| 2008/0270615 A1 | 10/2008 | Centola et al. |
| 2008/0275899 A1 | 11/2008 | Baluja et al. |
| 2008/0276183 A1 | 11/2008 | Siegrist et al. |
| 2008/0281622 A1 | 11/2008 | Hoal |
| 2008/0294624 A1 | 11/2008 | Kanigsberg et al. |
| 2008/0300980 A1 | 12/2008 | Benjamin et al. |
| 2008/0301240 A1 | 12/2008 | Svendsen |
| 2008/0301304 A1 | 12/2008 | Chitsaz et al. |
| 2008/0313011 A1 | 12/2008 | Rose et al. |
| 2008/0313206 A1 | 12/2008 | Kordun et al. |
| 2009/0006188 A1 | 1/2009 | Guo et al. |
| 2009/0006206 A1 | 1/2009 | Groe et al. |
| 2009/0006469 A1 | 1/2009 | Jain et al. |
| 2009/0018915 A1 | 1/2009 | Fisse |
| 2009/0037255 A1 | 2/2009 | Chiu et al. |
| 2009/0037257 A1 | 2/2009 | Stuckey et al. |
| 2009/0037517 A1 | 2/2009 | Frei |
| 2009/0043648 A1 | 2/2009 | Mahdian et al. |
| 2009/0055257 A1 | 2/2009 | Chien et al. |
| 2009/0055263 A1 | 2/2009 | Okubo et al. |
| 2009/0055285 A1 | 2/2009 | Law et al. |
| 2009/0063284 A1 | 3/2009 | Turpin et al. |
| 2009/0063467 A1 | 3/2009 | Abhyanker |
| 2009/0063613 A1 | 3/2009 | Chijiiwa et al. |
| 2009/0064183 A1 | 3/2009 | Chijiiwa et al. |
| 2009/0070219 A1 | 3/2009 | D'Angelo et al. |
| 2009/0070334 A1 | 3/2009 | Callahan et al. |
| 2009/0070684 A1 | 3/2009 | Aldrich et al. |
| 2009/0083134 A1 | 3/2009 | Burckart et al. |
| 2009/0099909 A1 | 4/2009 | Phan |

(56) References Cited

U.S. PATENT DOCUMENTS

| | | |
|---|---|---|
| 2009/0106040 A1 | 4/2009 | Jones |
| 2009/0106085 A1 | 4/2009 | Raimbeault |
| 2009/0106113 A1* | 4/2009 | Arora et al. .................. 705/14 |
| 2009/0106447 A1 | 4/2009 | Lection |
| 2009/0109978 A1 | 4/2009 | Zhu et al. |
| 2009/0112701 A1 | 4/2009 | Turpin et al. |
| 2009/0113480 A1 | 4/2009 | Allard et al. |
| 2009/0119167 A1 | 5/2009 | Kendall et al. |
| 2009/0171748 A1 | 7/2009 | Aven et al. |
| 2009/0182589 A1 | 7/2009 | Kendall et al. |
| 2009/0187486 A1 | 7/2009 | Lefenfeld et al. |
| 2009/0271247 A1 | 10/2009 | Karelin et al. |
| 2009/0292656 A1* | 11/2009 | Raman et al. .................. 706/11 |
| 2010/0010822 A1 | 1/2010 | Bal et al. |
| 2010/0023871 A1* | 1/2010 | Bederson et al. ............ 715/745 |
| 2010/0042931 A1 | 2/2010 | Dixon et al. |
| 2010/0049608 A1 | 2/2010 | Grossman |
| 2010/0050090 A1 | 2/2010 | Leebow |
| 2010/0057536 A1* | 3/2010 | Stefik et al. .................. 705/10 |
| 2010/0063892 A1 | 3/2010 | Keronen et al. |
| 2010/0070335 A1 | 3/2010 | Parekh et al. |
| 2010/0153212 A1 | 6/2010 | Stoll |
| 2010/0169363 A1 | 7/2010 | Gaedcke |
| 2010/0174593 A1* | 7/2010 | Cao et al. .................. 705/14.12 |
| 2010/0174726 A1 | 7/2010 | Nance et al. |
| 2010/0180029 A1 | 7/2010 | Fourman |
| 2010/0185513 A1 | 7/2010 | Anderson et al. |
| 2010/0201614 A1 | 8/2010 | Cohen |
| 2010/0217645 A1 | 8/2010 | Jin et al. |
| 2010/0223119 A1 | 9/2010 | Klish |
| 2010/0228582 A1* | 9/2010 | King et al. .................. 705/7 |
| 2010/0228614 A1 | 9/2010 | Zhang et al. |
| 2010/0228617 A1 | 9/2010 | Ransom et al. |
| 2010/0293054 A1 | 11/2010 | Lieberman |
| 2010/0293221 A1 | 11/2010 | Sidman et al. |
| 2011/0010448 A1 | 1/2011 | Gill et al. |
| 2011/0022621 A1 | 1/2011 | Luo et al. |
| 2011/0029388 A1 | 2/2011 | Kendall et al. |
| 2011/0040586 A1 | 2/2011 | Murray et al. |
| 2011/0040629 A1 | 2/2011 | Chiu et al. |
| 2011/0041168 A1 | 2/2011 | Murray et al. |
| 2011/0078228 A1 | 3/2011 | Bristol et al. |
| 2011/0093336 A1 | 4/2011 | Calabria |
| 2011/0154203 A1* | 6/2011 | Spencer et al. ............... 715/719 |
| 2011/0161419 A1 | 6/2011 | Chunilal |
| 2011/0208582 A1 | 8/2011 | Hoyle |
| 2011/0231240 A1 | 9/2011 | Schoen et al. |
| 2011/0264499 A1 | 10/2011 | Abendroth et al. |
| 2011/0264535 A1 | 10/2011 | Lee et al. |
| 2011/0276396 A1 | 11/2011 | Rathod |
| 2011/0282972 A1 | 11/2011 | Rosen |
| 2011/0320274 A1* | 12/2011 | Patil .......................... 705/14.49 |
| 2012/0030593 A1 | 2/2012 | Arunachalam |
| 2012/0042236 A1 | 2/2012 | Adler |
| 2012/0072428 A1 | 3/2012 | Kao et al. |
| 2012/0095836 A1 | 4/2012 | Kendall et al. |
| 2012/0101898 A1 | 4/2012 | Kendall et al. |
| 2012/0109757 A1 | 5/2012 | Kendall et al. |
| 2012/0110080 A1 | 5/2012 | Panyam et al. |
| 2012/0131448 A1 | 5/2012 | Chijiiwa et al. |
| 2012/0151359 A1 | 6/2012 | Mysen et al. |
| 2012/0185942 A1 | 7/2012 | Dixon et al. |
| 2012/0203831 A1 | 8/2012 | Schoen et al. |
| 2012/0203847 A1 | 8/2012 | Kendall et al. |
| 2012/0204096 A1 | 8/2012 | Kendall et al. |
| 2012/0208512 A1 | 8/2012 | Maharajh et al. |
| 2012/0233009 A1 | 9/2012 | Fougner et al. |
| 2012/0239750 A1 | 9/2012 | Schoen et al. |
| 2012/0246232 A1 | 9/2012 | Schoen et al. |
| 2013/0014030 A1 | 1/2013 | Schoen et al. |
| 2013/0024250 A1 | 1/2013 | Wu et al. |
| 2013/0073983 A1 | 3/2013 | Rasmussen et al. |
| 2013/0198008 A1 | 8/2013 | Kendall et al. |
| 2013/0297702 A1 | 11/2013 | Schoen et al. |
| 2014/0108965 A1 | 4/2014 | Schoen et al. |
| 2014/0115500 A1 | 4/2014 | Schoen et al. |
| 2014/0122249 A1 | 5/2014 | Schoen et al. |
| 2014/0123034 A1 | 5/2014 | Schoen et al. |
| 2014/0040042 A1 | 10/2014 | Schoen et al. |
| 2014/0337142 A1 | 11/2014 | Li et al. |

FOREIGN PATENT DOCUMENTS

| | | |
|---|---|---|
| JP | H11-3348 A | 1/1999 |
| JP | 2002-092408 A | 3/2002 |
| JP | 2002-334257 A | 11/2002 |
| JP | 2003-316710 A | 11/2003 |
| JP | 2004-192166 A | 7/2004 |
| JP | 2006-309660 A | 11/2006 |
| JP | 2007-206876 | 8/2007 |
| JP | 2007-206876 A | 8/2007 |
| JP | 2007-241558 | 9/2007 |
| JP | 2007-241558 A | 9/2007 |
| JP | 2007-241894 | 9/2007 |
| JP | 2007-241894 A | 9/2007 |
| JP | 2010-044303 A | 2/2010 |
| JP | 2010-063114 A | 3/2010 |
| JP | 2012-523613 A | 10/2012 |
| KR | 10-2011-0032878 A | 3/2011 |
| WO | WO 98/09447 | 3/1998 |
| WO | WO 2009/061616 A1 | 5/2009 |
| WO | WO 2009/061617 A1 | 5/2009 |
| WO | WO 2010/117568 A1 | 10/2010 |
| WO | WO 2011/078975 A1 | 6/2011 |
| WO | WO 2012/082318 A1 | 6/2012 |

OTHER PUBLICATIONS

Anonymous, "HTTP cookie," Wikipedia, the free encyclopedia, Oct. 2007, XP002680841, sixteen pages. [Online] [Retrieved Jul. 26, 2012] Retrieved from the Internet <URL:http://en.wikipedia.org/w/index.php?title=HTTP_cookie&oldid=168063574.>.

Australian Government, IP Australia, Examiner's First Report, Australian Patent Application No. 2008-324952, May 21, 2012, two pages.

Canadian Intellectual Property Office, Office Action, Canadian Patent Application No. 2,704,680, Jul. 25, 2012, two pages.

Canadian Intellectual Property Office, Office Action, Canadian Patent Application No. 2,703,851, Aug. 6, 2012, three pages.

European Patent Office, Supplementary European Search Report and Opinion, European Patent Application No. 08847154.5, Sep. 3, 2012, eight pages.

PCT International Preliminary Report on Patentability, PCT Application No. PCT/US2008/080790, May 20, 2010, five pages.

PCT International Search Report and Written Opinion, PCT Application No. PCT/US2008/080790, Dec. 19, 2008, nine pages.

PCT International Search Report and Written Opinion, PCT Application No. PCT/US2008/080789, Dec. 12, 2008, seven pages.

PCT International Search Report and Written Opinion, PCT Application No. PCT/US2012/023631, Sep. 10, 2012, six pages.

State Intellectual Property Office of the People's Republic of China, First Office Action, Chinese Patent Application No. 2008-80114546.2, Oct. 14, 2011, eight pages.

State Intellectual Property Office of the People's Republic of China, Rejection Decision, Chinese Patent Application No. 2008-80114546.2, Jun. 20, 2012, nine pages.

U.S. Office Action, U.S. Appl. No. 12/193,702, Aug. 18, 2010, forty-nine pages.

U.S. Office Action, U.S. Appl. No. 12/193,702, Dec. 22, 2010, forty-eight pages.

U.S. Office Action, U.S. Appl. No. 12/193,702, Jan. 23, 2012, forty pages.

U.S. Office Action, U.S. Appl. No. 12/193,702, Jul. 25, 2011, forty-two pages.

U.S. Office Action, U.S. Appl. No. 12/853,241, May 22, 2012, thirty-one pages.

U.S. Office Action, U.S. Appl. No. 13/338,190, Mar. 27, 2012, fifty-two pages.

(56) References Cited

OTHER PUBLICATIONS

U.S. Office Action, U.S. Appl. No. 13/338,190, Sep. 6, 2012, eighty-four pages.
U.S. Office Action, U.S. Appl. No. 13/342,003, Dec. 12, 2012, thirty-four pages.
U.S. Office Action, U.S. Appl. No. 13/342,006, May 8, 2012, sixty-three pages.
U.S. Office Action, U.S. Appl. No. 13/447,100, Jul. 27, 2012, thirty-three pages.
U.S. Office Action, U.S. Appl. No. 13/447,100, Nov. 14, 2012, thirty-five pages.
U.S. Office Action, U.S. Appl. No. 13/447,102, Jun. 1, 2012, sixty-two pages.
U.S. Office Action, U.S. Appl. No. 13/447,102, Nov. 29, 2012, sixty pages.
U.S. Office Action, U.S. Appl. No. 13/488,275, Sep. 4, 2012, ten pages.
U.S. Office Action, U.S. Appl. No. 13/488,596, Sep. 18, 2012, ten pages.
U.S. Office Action, U.S. Appl. No. 13/619,894, Jan. 7, 2013, seven pages.
U.S. Appl. No. 13/804,150, filed Mar. 14, 2013, Inventors Timothy Kendall et al.
U.S. Office Action, U.S. Appl. No. 12/853,241, Apr. 22, 2013, thirty-nine pages.
U.S. Office Action, U.S. Appl. No. 13/447,100, Apr. 24, 2013, twenty-five pages.
United States Patent and Trademark Office, Before the Patent Trial and Appeal Board, Decision on Appeal, Appeal No. 2017-003261, U.S. Appl. No. 14/340,360, dated Sep. 29, 2017, seven pages.
Australian Government, IP Australia, Patent Examination Report No. 1, Australian Patent Application No. 2012212117, dated Nov. 17, 2015, four pages.
Australian Patent Office, Patent Examination Report No. 1, Australian Patent Application No. 2011341576, dated Mar. 24, 2016, two pages.
Canadian Intellectual Property Office, Office Action, Canadian Patent Application No. 2,704,680, dated Jun. 8, 2015, three pages.
Canadian Intellectual Property Office, Office Action, Canadian Patent Application No. 2,704,680, dated Sep. 13, 2013, two pages.
Canadian Intellectual Property Office, Office Action, Canadian Patent Application No. 2,820,214, dated May 31, 2017, four pages.
Canadian Intellectual Property Office, Office Action, Canadian Patent Application No. 2,825,760, dated Jan. 16, 2015, five pages.
European Patent Office, Extended Search Report and Opinion, European Patent Application No. 11848342.9, dated Apr. 8, 2016, six pages.
Japan Patent Office, Office Action, Japanese Patent Application No. 2013-544502, dated Jul. 14, 2015, six pages.
Japan Patent Office, Office Action, Japanese Patent Application No. 2013-544502, dated Mar. 8, 2016, eight pages.
Japan Patent Office, Office Action, Japanese Patent Application No. 2013-552629, dated Nov. 4, 2015, eight pages.
Korea Intellectual Property Office, Office Action, Korean Patent Application No. 10-2013-7018119, dated Jun. 14, 2017, fifteen pages.
Mexican Institute of Industrial Property, Division of Patents, Office Action, Mexican Patent Application No. MX/a/2013/008792, dated Mar. 17, 2015, four pages.
Mexican Institute of Industrial Property, Division of Patents, Office Action, Mexican Patent Application No. MX/a/2013/006825, dated Dec. 9, 2014, four pages [with summary in English].
Mexican Institute of Industrial Property, Division of Patents, Office Action, Mexican Patent Application No. MX/a/2013/006825, dated May 24, 2016, seven pages [with summary in English].
Mexican Institute of Industrial Property, Division of Patents, Office Action, Mexican Patent Application No. MX/a/2013/006825, dated Nov. 29, 2016, seven pages [with summary in English].
PCT International Search Report and Written Opinion, PCT Application No. PCT/US2011/049076, dated Apr. 27, 2012, six pages.
PCT International Search Report and Written Opinion, PCT Application No. PCT/US2013/043189, dated Aug. 28, 2013, eleven pages.
State Intellectual Property Office of the People's Republic of China, First Office Action, Chinese Patent Application No. 201180067562.2, dated Oct. 9, 2015, seventeen pages.
State Intellectual Property Office of the People's Republic of China, Second Office Action, Chinese Patent Application No. 201180067562.2, dated Jul. 5, 2016, sixteen pages.
State Intellectual Property Office of the People's Republic of China, Decision of Rejection, Chinese Patent Application No. 201180067562.2, Nov. 24, 2016, twelve pages.
U.S. Office Action, U.S. Appl. No. 12/193,702, dated Sep. 23, 2013, fifty-seven pages.
U.S. Office Action, U.S. Appl. No. 12/853,241, dated Apr. 22, 2013, thirty-nine pages.
U.S. Office Action, U.S. Appl. No. 12/853,241, dated Aug. 18, 2014, thirty-two pages.
U.S. Office Action, U.S. Appl. No. 12/853,241, dated Nov. 20, 2013, forty pages.
U.S. Office Action, U.S. Appl. No. 12/853,241, dated Nov. 20, 2014, nine pages.
U.S. Office Action, U.S. Appl. No. 13/327,557, dated Feb. 21, 2014, seventeen pages.
U.S. Office Action, U.S. Appl. No. 13/327,557, dated Jun. 4, 2014, twenty-two pages.
U.S. Office Action, U.S. Appl. No. 13/327,557, dated May 10, 2013, nineteen pages.
U.S. Office Action, U.S. Appl. No. 13/342,003, dated Apr. 5, 2013, fifty-six pages.
U.S. Office Action, U.S. Appl. No. 13/342,003, dated Sep. 25, 2013, forty pages.
U.S. Office Action, U.S. Appl. No. 13/447,100, dated Aug. 14, 2013, forty-six pages.
U.S. Office Action. U.S. Appl. No. 13/447,102, dated Aug. 15, 2014, thirty-five pages.
U.S. Office Action, U.S. Appl. No. 13/447,102, dated Nov. 21, 2014, ten pages.
U.S. Office Action, U.S. Appl. No. 13/619,894, dated Sep. 24, 2013, four pages.
U.S. Office Action, U.S. Appl. No. 13/804,150, dated Feb. 21, 2014, fifty-five pages.
U.S. Office Action, U.S. Appl. No. 13/804,150, dated Jul. 22, 2014, twenty-four pages.
U.S. Office Action, U.S. Appl. No. 13/804,150, dated Nov. 25, 2014, fourteen pages.
U.S. Office Action, U.S. Appl. No. 13/938,139, dated Oct. 23, 2014, ten pages.
U.S. Office Action, U.S. Appl. No. 14/048,034, dated Dec. 6, 2013, seven pages.
U.S. Office Action, U.S. Appl. No. 14/137,820, dated Nov. 5, 2014, five pages.
U.S. Office Action, U.S. Appl. No. 14/137,825, dated Feb. 16, 2017, ten pages.
U.S. Office Action, U.S. Appl. No. 14/137,825, dated Feb. 9, 2016, twelve pages.
U.S. Office Action, U.S. Appl. No. 14/137,825, dated Jul. 29, 2016, six pages.
U.S. Office Action, U.S. Appl. No. 14/137,829, dated Sep. 26, 2016, seven pages.
U.S. Office Action, U.S. Appl. No. 14/137,834, dated Apr. 12, 2016, eleven pages.
U.S. Office Action, U.S. Appl. No. 14/340,360, dated Oct. 6, 2014, seven pages.
U.S. Office Action, U.S. Appl. No. 14/792,528, dated Jul. 25, 2016, eighteen pages.
U.S. Office Action, U.S. Appl. No. 14/792,528, dated Oct. 8, 2015, seventeen pages.
United States Patent and Trademark Office, Before the Patent Trial and Appeal Board, Decision on Request for Rehearing, Appeal No. 2015-008149, U.S. Appl. No. 13/447,102, dated Aug. 25, 2017, ten pages.

(56) References Cited

OTHER PUBLICATIONS

United States Patent and Trademark Office, Before the Patent Trial and Appeal Board, Decision on Request for Rehearing, Appeal No. 2015-008182, U.S. Appl. No. 12/853,241, dated Aug. 25, 2017, twelve pages.
U.S. Appl. No. 60/981,781, filed Oct. 22, 2007, Inventors: Gill et al. [copy not enclosed].
Korea Intellectual Property Office, Office Action, Korean Patent Application No. 10-2013-7018119, dated Dec. 19, 2017, six pages.
State Intellectual Property Office of the People's Republic of China, Notification of Reexamination, Chinese Patent Application No. 201180067562.2, dated Sep. 25, 2017, fifteen pages.

* cited by examiner

TARGETING SOCIAL ADVERTISING TO FRIENDS OF USERS WHO HAVE INTERACTED WITH AN OBJECT ASSOCIATED WITH THE ADVERTISING

BACKGROUND

This invention generally pertains to social networking, and more specifically to combining social networking system content and advertisements in a social networking environment.

Social networks, or social utilities that track and enable connections between members (including people, businesses, and other entities), have become prevalent in recent years. In particular, social networking systems allow members to communicate information more efficiently. For example, a member may post contact information, background information, job information, hobbies, and/or other member-specific data to a location associated with the member on a social networking system. Other members can then review the posted data by browsing member profiles or searching for profiles including specific data. The social networking systems also allow members to associate themselves with other members, thus creating a web of connections among the members of the social networking system. These connections among the members can be exploited by the social networking system to offer more relevant information to each member in view of the members' own stated interests.

Social networking systems typically incorporate a system for connecting members to content that is most likely to be relevant to each member. For example, members may be grouped according to one or more common attributes in their profiles, such as geographic location, employer, job type, age, music preferences, interests, or other attributes. Members of the social networking system or external parties can then use these groups to customize or target information delivery so that information that might be of particular interest to a group can be communicated to that group.

Advertisers have attempted to leverage this information about members by targeting their ads to members whose interests best align with the ads. For example, a social networking system may display banner ads for a concert to members who include an affinity for the performing band in their social networking system profile and live near a concert venue where that band might be performing. However, these attempts are no different than targeting of ads that exist in many other contexts. Advertisers have not yet been able to exploit the relationships and connections among members of a social networking system in a meaningful way to increase user engagement with an advertisement or the advertised product.

SUMMARY

Embodiments of the invention provide social advertisements to a viewing user, where a social advertisement comprises advertising content and a social story related to the advertising content. The social story may describe an action of another user connected to the viewing user who has interacted with a social networking object associated with an advertisement. For example, if a viewing user is connected to another user in a social networking system who has confirmed attendance of an event, the social advertisement sent to the viewing user may comprise an advertisement for the event and a statement that the other user is planning to attend the event. In this way, social advertisements improve the effectiveness of the advertisement by leveraging the social interaction information stored within the social networking system. For example, a viewing user is more likely to notice or take interest in advertisements wherein the viewing user's friends are featured. A viewing user can also be more likely to interact with an advertisement that is associated with his or her friends' interests or interactions. Thus, the social networking system can provide a more interactive social networking experience by providing social advertisements likely to be relevant to a viewing user and/or social advertisements that a viewing user is likely to interact with. Additionally, advertisers can reach a greater target audience by reaching out to friends of a user who has interacted with an object associated with an advertisement within the social networking system.

In one embodiment, a social networking system generates a social advertisement for display to a viewing user when the viewing user requests content (e.g., a web page) with which an advertisement is to be served. The social advertisements are selected from advertisements provided by one or more advertisers, where the advertisements each have a relationship between their advertising content and one or more social networking objects. The advertisement may include metadata that specifies this relationship with one or more objects, or the social networking system may discover the relationship between the advertisement and the objects (e.g., a fan page, an event, a game, etc.) based on a landing URL in the advertisement or some other signal associated with the advertisement.

To generate a social advertisement for a particular viewing user, the social networking system maintains an index for each of at least some of the users with who the viewing user is connected, where each index identifies a number of social networking objects with which that user is connected. A user may be connected to a social networking object in various ways, such as joining a group, attending an event, checking in at a location, or becoming a fan of a page. Using the indexes, the social networking system identifies a set of candidate advertisements that are associated with at least one social networking object in an index. In this way, each of the identified candidate advertisements is associated with a social networking object to which at least one of the viewing user's friends is connected, which provides a possible social story to be included with the advertisement. The social networking system selects a candidate advertisement, combines it with a social story to create a social advertisement, and sends the social advertisement for display to the viewing user.

The social networking system may select which social advertisement to display to a viewing user using various criteria. For example, the social networking system may provide a social advertisement to a viewing user based on a likelihood that the viewing user will click on the advertisement or on an expected revenue associated therewith. The social networking system may also apply targeting criteria provided by the advertiser, which may specify which social networking objects to be used when identifying candidate advertisements. The social networking system may also apply any applicable privacy policies in the social networking system, e.g., to prevent sending a social advertisement that communicates an action about a user whose privacy policies disallow such communication. The social advertisement may also be selected for a particular viewing user based at least in part on the relationship between the viewing user and the interacting user within the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. In addition to interactions with other users, the social networking system provides users with the ability to take actions on various types of items supported by the system.

Figure 1:
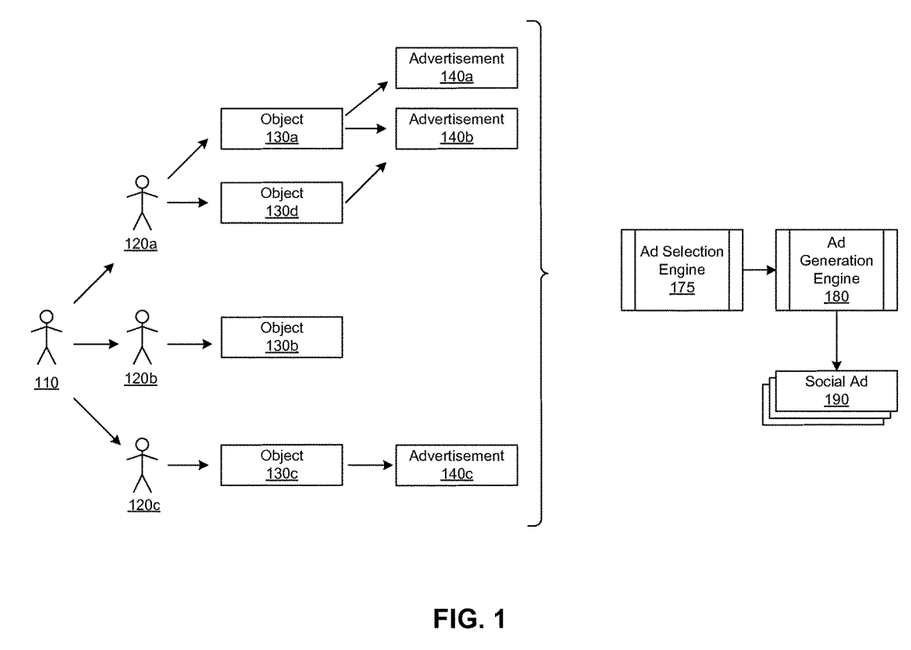
FIG. 1 is a diagram of a system for providing a social advertisement to a user of a social networking system, in accordance with an embodiment of the invention.

FIG. 1 illustrates a system for providing social advertisement to users of a social networking system, in accordance with an embodiment of the invention. FIG. 1 illustrates a viewing user 110, the user's friends 120, social networking objects 130, candidate advertisements 140, an ad selection engine 175, an ad generation engine 180 and social advertisements 190.

In one embodiment, the social networking system provides a social advertisement 190 to a viewing user 110 of the social networking system wherein the social advertisement includes an advertisement and one or more social stories. A social story includes interaction information between the viewing user's one or more friends 120 and a social networking object 130. A social networking object 130 can represent a variety of things, including, without limitation, other users of the social networking system (represented, e.g., as a profile object for the user), applications (e.g., a games playable within the social networking system), events (e.g., a concert that users may attend), groups (to which users may belong), page or hubs (e.g., pages constituting a particular organization's presence on the system), locations associated with a user (e.g., "Santa Clara, Calif., USA"), and concepts or other terms (e.g., "Running"). A user can interact with social networking objects by associating with an object or by acting on an object. For example, a user can interact with objects 130 by joining a group, attending an event, checking in at a location, becoming a fan of a web page object, clicking on an object, etc.

In one embodiment, a social story included in a social advertisement includes information about the viewing user's friends' interaction with a social networking object that is related to an advertisement. For example, if a user's friend interacts with an object by becoming a fan of the object related to an advertisement, the social advertisement can comprise the advertisement and a message stating that the user's friend recently became a fan of the object. In another example, if several friends of the user become fans of the object related to an advertisement, the social advertisement can comprise the advertisement and a message stating the number of other friends of the user who became fans of the object.

Out of the advertisements that are related to social networking objects, in one embodiment, the social networking system identifies candidate advertisements 140 for which there exists a potential social story associated with the viewing user's friends. For example, the social networking system can identify candidate advertisements 140 associated with a social networking object 130 to which at least one of the viewing user's friends 120 is connected, which provides a possible social story to be included with the advertisement.

In one embodiment, the ad selection engine 175 selects a candidate advertisement 140 based on the relationship between the viewing user 110 and the friend 120, the expected value to be generated by displaying the advertisement, the advertiser provided ad targeting criteria, the privacy criteria provided by the viewing user 110 and the friend 120, or any combination thereof. In one embodiment, the ad generation engine 180 generates social advertisements 190 to display to a viewing user 110, wherein the social advertisement comprises an advertisement and one or more social stories.

System Architecture

Figure 2A:
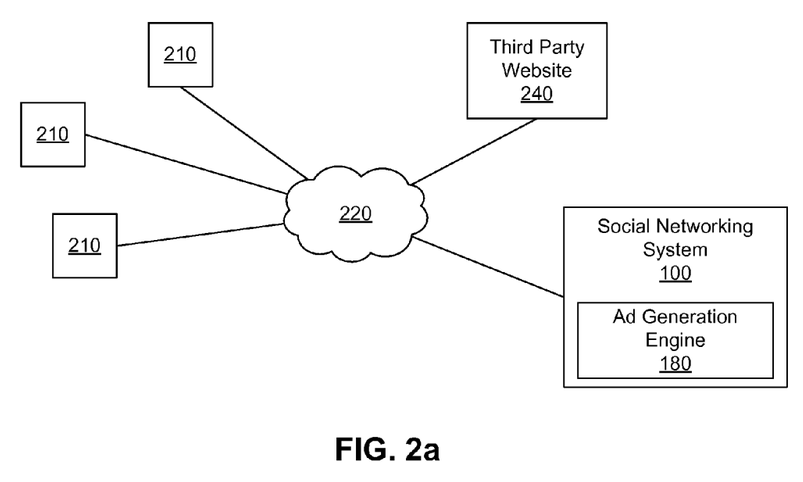
FIG. 2 is a network diagram of a system for providing customer advertisements to users of a social networking system, in accordance with an embodiment of the invention.

FIG. 2A is a high level block diagram illustrating a system environment suitable for operation of a social networking system 100. The system environment comprises one or more client devices 210, one or more third-party websites 140, a social networking system 100, and a network 220. In alternative configurations, different and/or additional modules can be included in the system.

The client devices 210 comprise one or more computing devices that can receive member input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems. As described above, the third party website 240 and the action terminal 150 are coupled to the network 220 for communicating messages to the social networking system 100 about the users' actions off the system 100.

The social networking system 100 comprises a computing system that allows users to communicate or otherwise interact with each other and access content as described herein. In one embodiment, the social networking system 100 stores member profiles that describe the users of a social network, including biographic, demographic, and other types of descriptive information, such as work experience, educational history, hobbies or preferences, location, and the like.

Figure 2B:
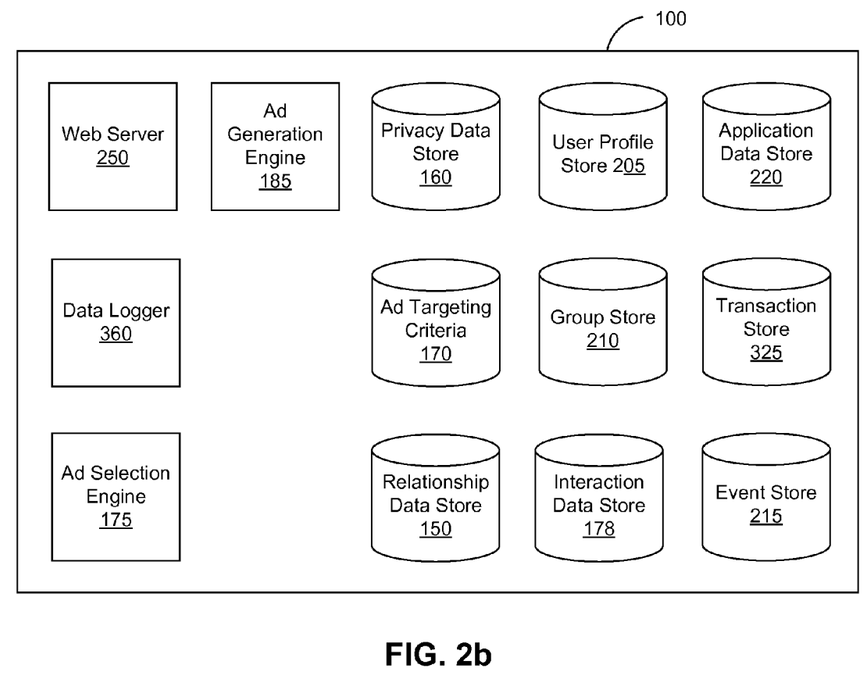

FIG. 2b is an example block diagram of a social networking system 100. The social networking system 100 includes a web server 250, a data logger 260, a user profile store 205, a group store 210, an event store 215, an application data store 220, a transaction store 225, and a content store 230. In other embodiments, the social networking system 100 may include additional, fewer, or different modules for various applications.

The web server 250 links the social networking system 100 via the network 220 to one or more client devices 210, as well as to one or more third party websites 240. The web server 250 may include a mail server or other messaging functionality for receiving and routing messages between the social networking system 100 and the client devices 210 or third party websites 240. The messages can be instant messages, queued messages (e.g., email), text and SMS messages, or any other suitable messaging technique.

The data logger 260 is capable of receiving communications from the web server 250 about member actions on and/or off the social networking system 100. The data logger 260 populates the interaction data store 178 with information about these member actions and communications associated with one or more social networking objects.

The social networking system 100 maintains data about a number of different types of objects with which a member may interact on the system 100. To this end, each of the user profile store 205, the group store 210, the event store 215, the application data store 220, and the transaction store 225 store data structures to manage the data for each instance of the corresponding type of object maintained by the system 100. The data structures comprise information fields that are suitable for the corresponding type of object. (For example, the event store 215 contains data structures that include the time and location for an event, whereas the member profile store 205 contains data structures with fields suitable for describing a member's profile.) When a new object of a particular type is created, the system 100 initializes a new data structure of the corresponding type, assigns a unique object identifier to it, and begins to add data to the object as needed. This might occur, for example, when a member defines a new event, wherein the system 100 would generate a new instance of an event in the event store 215, assign a unique identifier to the event, and begin to populate the fields of the event with information provided by the member.

In one embodiment, the social networking system identifies candidate advertisements 140 that can be displayed to a viewing user 110 in a social advertisement, wherein the candidate advertisement 140 is associated with an object 130 that a viewing user's friend 120 has interacted with. A viewing user 110 is a member of the social networking system. In one embodiment, the social networking system generates social advertisements when a viewing user 110 requests content (e.g., a web page) with which an advertisement is to be served. The viewing user's friends 120 are other users of the social networking system who have established a connection with the viewing user 110 within the social networking system. As used herein, therefore, the term "friend" refers to any other user with whom a user has formed a connection, association, or relationship via the social networking system. Connections may be added explicitly by a user, for example, the user selecting a particular other user to be a friend, or automatically created by the social networking system based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other within the social networking system, Bob and Joe, both users, are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

Users of the social networking system including friends 120 of the viewing user 110 can interact with one or more objects 130 within the social networking system. As described in greater detail above, objects 130 within the social networking system represent a variety of things within the social networking system. In one embodiment, the friends 120 of the user 110 interact with objects 130 within the social networking system. For example, a friend 120 can interact with a calendar object, by adding an event to a calendar. In another example, a user, including a friend 120 can interact with an application object within the social networking system by playing a video game associated with the application object. Associations within the social networking system can include a variety of things, including, without limitation, joining a group, attending an event, checking in at a location, or becoming a fan of a page. In one embodiment, the association between the viewing user's friend 120 and an object 130 can be used a social story in a social advertisement, as described in greater detail below.

An object 130 can be related to an advertisement. In one embodiment, an advertiser may specify the relationship between an advertisement and a social networking object 130. For example, an advertiser can provide that an advertisement for a product, NIKE shoes should be related with a fan page object, such as a Nike fan page or a fan page about running. In another embodiment, an advertiser may provide that an advertisement to be related with certain keyword tags. In such an embodiment, the social networking system searches the objects within the social networking system and relates an advertisement to an object based on a tag or keyword matching algorithm. In another embodiment, the social networking system discovers the relationship between an advertisement and an object without requiring the advertisement to specify it. For example, the social networking system may determine from a landing URL associated with the advertisement whether the advertisement promotes a fan page in the social networking system or a platform application (such as a game) within the social networking system. The social networking system may also determine a concept associated with the advertisement based on the advertisement's content. For example, if the advertisement promotes golf tools, the social networking system may automatically associate the advertisement with the "golf" object in the social networking system. This allows the system to display a social story, such as: "Friends A, B, and C like golf."

Since a social advertisement 190 includes a social story about a user's friend's action with respect to an object 130, the social networking system identifies candidate advertisements 140 for which there exists a potential story. For example, a social advertisement 190 can be selected from advertisements provided by one or more advertisers, where the advertisements each specify a relationship between their advertising content and one or more social networking objects 130. Furthermore, the social networking system identifies candidate advertisements 140 associated with a social networking object to which at least one of the viewing user's friends 120 is connected, which provides a possible social story to be included with the advertisement. In one embodiment, the social networking system identifies friends 120 of the viewing user 110. As illustrated in FIG. 1 for example, a viewing user 110 can have friends 120a, 120b and 120c. In one embodiment, the social networking system maintains an index for each of at least some of the users with who the viewing user is connected, where each index identifies a number of social networking objects with which that user is connected. As illustrated in FIG. 1, object 130*a* can be indexed to friend 120*a* if the friend 120*a* is associated with the object 130*a*. As described above, a user of a social networking system can associate with a social networking object by viewing the object or acting on the object by becoming a fan of the object, linking the object to a fan page, playing a game associated with an application object, etc.

In one embodiment, the social networking system identifies a set of candidate advertisements that are associated with at least one social networking object 130 in an index. For example, as illustrated in FIG. 1 advertisements 140*a*, 140*b*, and 140*c* can be identified as candidate advertisements because the advertisements are related to objects 130 associated with friends 120 of the viewing user. As described above, advertisement can be associated with objects as provided by an advertiser. For example, a running shoe manufacturer may provide an advertisement to be displayed on a web page object "Runners' Corner" that is associated with a fan page called "Runner's Corner." In one embodiment, the social networking system indexes each advertisement 140 associated with the indexed object 130.

In one embodiment, the ad selection engine 175 select which advertisement 140 to display to a viewing user 110 as a social advertisement 190. For example, in response to a viewing user requesting a web page or an object associated with the social networking system, the ad selection engine 175 selects an advertisement 140 to serve to the viewing user 110. In one embodiment, the ad selection engine 175 ranks advertisements 140 according to their expected value. The expected value accounts for the probability of the viewing user clicking on the advertisement and the price for each advertisement as applied to click through pricing models. The ad selection engine 175 may also select an advertisement 140 to display as a social advertisement to the user based on whether the user meets the advertiser provided ad targeting criteria. For example, an advertiser can provide targeting criteria wherein social advertisements based on the advertisement 140 should be displayed to males. In such an instance, the ad selection engine 175 does not select the advertisement 140 if the viewing user 110 is a female. In another embodiment, the ad selection engine 175 takes into account the interacting user's privacy criteria. For example, if the interacting user provides that his or her interaction activity should not be displayed to other users, the ad selection engine 175 does not select the advertisement 140 as a basis of a social advertisement to display to the user. Thus, the ad selection engine 175 only selects the advertisement 140 for display as a social advertisement if the viewing user meets the privacy criteria of the interacting user.

In one embodiment, the ad generation engine 180 generates a social advertisement 190 based on advertisement message associated with the advertisement 140 and viewing user's 110 friends 120 interaction information with an object associated with the advertisement 140. In one embodiment, the ad generation engine 180 retrieves advertisement messages associated with the advertisement 140 selected by the ad selection engine 175. An advertisement message can include text, images or videos provided by an advertiser. Additionally, the ad generation engine 180 can retrieve social interaction information from the interaction data store 178. As described in greater detail above, a social networking system can store social interaction information between users and objects of the social networking system. For example, if a user interacts with a web page object by posting a message associated with the web page object, the interaction of posting a message can be stored in the interaction data store 178. For each object associated with the advertisement 140 selected by the ad selection engine 175, the ad generation engine retrieves interaction information between the viewing user's friend 120 and the object the friend 120 has interacted with and is associated with the advertisement. In the example provided above, the ad generation engine 180 can retrieve the message posted by the viewing user's friend 120 or can retrieve that the viewing user's friend posted a message. In such an instance, the ad generation engine 180 generates a social advertisement 190 including the advertisement message and the social interaction information retrieved from the interaction data store 178. In addition, the generated social advertisement 190 can include additional information stored in the social networking system, such as the name and a picture of the viewing user's friend 120, the number of viewing user's friends 120 who have interacted with the object associated with the selected advertisement 140. The generated social advertisements 190 can be displayed to a viewing user as banner ads on a web page hosted by the social networking system, as an interactive pop-up ad, as a part of the viewing user's newsfeed, or in association with an application associated with the social networking system executing on a computing device.

In an alternative embodiment of the invention, the social networking system identifies viewing users 110 to receive a social advertisement. In such an embodiment, the social networking system accesses a database of advertisements, wherein each advertisement is associated with targeting criteria that specifies targeting the advertisement to a user who is connected in a social networking system to another user who has interacted with an object 130 in the social networking system. For example, a viewing user who meets the targeting criteria can be identified by the social networking system. Identifying a viewing user 110 based on the targeting criteria is described in greater detail below.

In one embodiment, the social networking system identifies one or more friends 120 of the viewing user in the social networking system. In order to identify candidate advertisements 140, the social networking system identifies objects associated with the friends 120, wherein the objects are related to advertisements. Furthermore, the social networking system identifies one or more candidate advertisements from the database of advertisements wherein the candidate advertisement is related to an object associated with the viewing user's friends. As described below the specification, the ad selection engine selects a candidate advertisement based on revenue metrics. The ad generation engine 185 generates a social story based on interaction information between the viewing user's friend 120 and an object in the social networking system. In one embodiment, the social networking system sends the advertisement and the social story for display to the viewing user.

Providing User Generated Advertisements

Figure 3A:
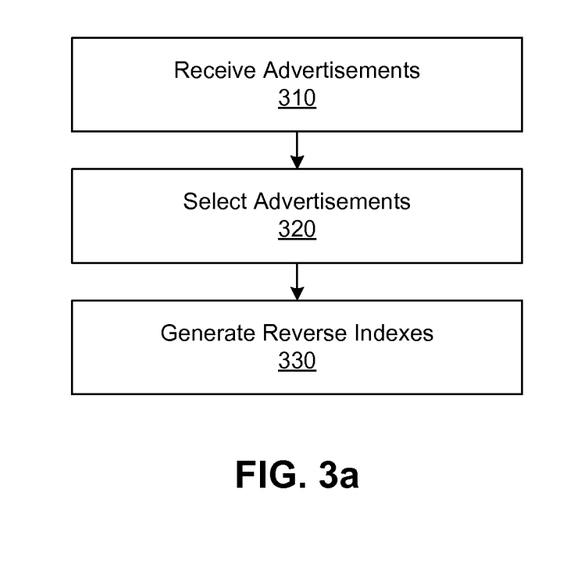
FIG. 3a is a flow chart of a process for identifying objects associated with advertisements, in accordance with an embodiment of the invention.

FIG. 3*a* is a flow chart of a process for identifying objects associated with social advertisements, in accordance with an embodiment of the invention. The social networking system receives 310 advertisements to display to users of the social networking system. In one embodiment, the advertisements can specify a relationship between their advertising content and one or more social networking objects. For example, if an advertiser wants an advertisement published on a web page object, the advertisement can specify such a relationship. In one embodiment, the social networking system selects 320 advertisements that specify a relationship with social networking objects.

In one embodiment, the social networking system generates 330 one or more indexes for each user of the social networking system. An index identifies a number of social networking objects with which that user is connected. For example, if a user has interacted or connected with a social networking object, the social networking system can generate 330 an index which can include information about the user, the object and the type of interaction.

Figure 3B:
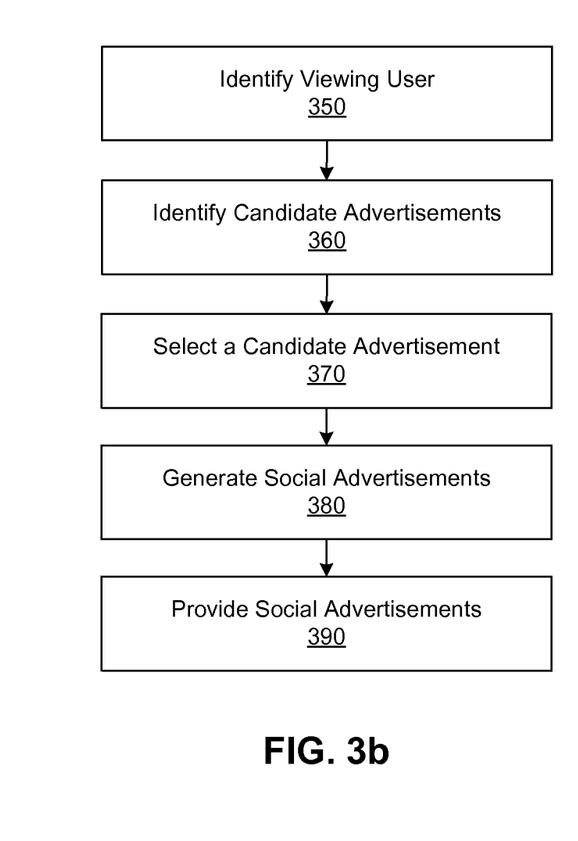
FIG. 3b is a flow chart of a process for providing a social advertisement to a viewing user of a social networking system, in accordance with an embodiment of the invention.

FIG. 3b is a flow chart of a process for providing a social advertisement to a viewing user of a social networking system, in accordance with an embodiment of the invention. In one embodiment, the social networking system identifies 350 a viewing user to display a social advertisement. For example, user can be identified 350 as a viewing user when the user requests content such as a web page with which an advertisement is to be served. In one embodiment, to generate and display social advertisements to the viewing user, the social networking system identifies 360 candidate advertisements that are associated with at least one social networking object associated with a friend of a viewing user. For example, the social networking system can identify friends 120 of the viewing user and retrieve one or more indexes identifying objects with which the friends have interacted with. The social networking system can use the index to identify 360 candidate advertisements that are related to at least one social networking object in an index.

In one embodiment, the social networking system selects 370 a candidate advertisement to use as a part of the social advertisement. The social networking system can use any number of publishing criteria to select 370 a candidate advertisement, including but not limited to the likelihood that a user will click on an social advertisement based on the candidate advertisement, the expected revenue associated therewith, the ad targeting criteria identifying the advertisement's target viewers and any applicable privacy policies which may prevent the social networking system from publishing actions about a user whose privacy policy disallows publishing such information. In another embodiment, the social networking system can select all candidate advertisements to generate a social ad, wherein the social networking system applies the above publishing criteria to determine which social ad to display to the user.

In one embodiment, the social networking system generates 380 social advertisements comprising a candidate advertisement and a social story. A social story includes interaction information between a user's friend 120 and an object related to the candidate advertisement. As described in greater detail above, the social story can include a message such as "Ten of your friends are interested in NIKE Shoes," wherein the object can be a NIKE fan page and the candidate advertisement content can be NIKE shoes. In one embodiment, the social networking system generates 380 a social advertisement by combining the candidate advertisement with a social story.

In one embodiment, the social networking system provides 390 social advertisements to the viewing user. The social advertisements may be provided 390 to the user based on the type of content requested by the viewing user. For example, the social advertisement may be provided in an ad space on a web page if the viewing user has requested a web page with which an advertisement is to be served. Similarly, the social advertisement may be provided 390 as a banner ad, a news feed story, a pop-up advertisement, etc., based on the type of content requested by the viewing user and the networking and rendering capabilities of the device on which the request is made.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a plurality of advertisement requests, each advertising request comprising advertising content and an identification of one or more objects in a social networking system;
identifying a viewing user to receive advertising;
identifying one or more other users who are connected to the viewing user in the social networking system;
identifying a plurality of objects in the social networking system with which the identified one or more other users have interacted;
identifying one or more candidate advertisements based on the advertisement requests, where each candidate advertisement is associated with an advertisement request that identified at least one of the identified objects with which the identified one or more other users have interacted;
selecting a candidate advertisement for display to the viewing user;
generating by a processor a social advertisement that comprises (1) the advertising content for the advertisement request associated with the selected candidate advertisement and (2) a social story that describes an interaction between a user who is connected with the viewing user and an object in the social networking system; and
sending the social advertisement for display to the viewing user.

2. The method of claim 1, wherein the viewing user is identified responsive to the viewing user requesting content with which an advertisement is to be served.

3. The method of claim 1, wherein at least one of the advertising requests explicitly identifies one or more objects in a social networking system.

4. The method of claim 1, wherein at least one of the advertising requests inherently identifies one or more objects in a social networking system, and wherein the method further comprises identifying one or more objects in the social networking system based on the advertising content.

5. The method of claim 1, further comprising:
generating an index for each of at least some of the users with who the viewing user is connected, the index mapping each user to one or more objects with which the users have interacted; and
using the index to identify a plurality of objects in the social networking system with which one or more other users have interacted.

6. The method of claim 1, wherein selecting the candidate advertisement comprises:
ranking the plurality of objects based on the number of interactions by the identified other users who are connected to the viewing user;
ranking the candidate advertisements based on the number of interactions with each of their associated objects; and
selecting the candidate advertisement based on the ranking.

7. The method of claim 6, wherein selecting the candidate advertisement comprises ranking the plurality of objects based on the type of interactions between the identified other users who are connected to the view user and the plurality of objects.

8. The method of claim 1, wherein generating a social advertisement comprises:
selecting an object from a plurality of objects associated with the advertisement request for the selected candidate advertisement; and
composing the social story based on the selected object.

9. The method of claim 1, wherein generating a social advertisement comprises:
selecting a user from a plurality of other users who have interacted with an object identified by the advertisement request for the selected candidate advertisement; and
composing the social story based on the selected user.

10. The method of claim 1, wherein the generated social advertisement is provided to the viewing user responsive to the viewing user requesting a social networking content.

11. The method of claim 1, wherein the social advertisement comprises one or more social stories included with the advertisement.

12. The method of claim 1, wherein the social story includes interaction information of one or more users associated with the viewing user who has interacted with the one or more identified objects.

13. A method comprising:
accessing a database of advertisements, each advertisement associated with targeting criteria that specifies targeting the advertisement to a user who is connected in a social networking system to another user who has interacted with a particular object in the social networking system;
identifying a viewing user to receive advertising;
identifying one or more other users who are connected to the viewing user in the social networking system;
identifying one or more candidate advertisements from the database of advertisements using the targeting criteria;
selecting an advertisement from the candidate advertisements for display to the viewing user;
generating by a processor a social story based on an interaction between a user from the identified one or more other users who are connected to the viewing user and the particular object in the social networking system; and
sending the selected advertisement and the social story for display to the viewing user.

14. The method of claim 13, wherein the viewing user is identified responsive to the viewing user requesting content with which an advertisement is to be served.

15. The method of claim 13, further comprising:
generating an index for each of at least some of the users with who the viewing user is connected, the index mapping each user to one or more objects with which the users have interacted; and
using the index to identify a plurality of objects in the social networking system with which one or more other users have interacted.

16. The method of claim 13, wherein identifying the candidate advertisement comprises:
ranking the plurality of objects based on the number of interactions by the identified other users who are connected to the viewing user;
ranking the candidate advertisements based on the number of interactions with each of their associated objects; and
selecting the candidate advertisement based on the ranking.

17. The method of claim 16, wherein identifying the candidate advertisement comprises ranking the plurality of objects based on the type of interactions between the identified other users who are connected to the view user and the plurality of objects.

18. The method of claim 13, wherein generating a social advertisement comprises:
   selecting an object from a plurality of objects associated with the advertisement request for the selected candidate advertisement; and
   composing the social story based on the selected object.

19. The method of claim 13, wherein generating a social advertisement comprises:
   selecting a user from a plurality of other users who have interacted with an object identified by the advertisement request for the selected candidate advertisement; and
   composing the social story based on the selected user.

20. The method of claim 13, wherein the generated social advertisement is provided to the viewing user responsive to the viewing user requesting a social networking content.

21. The method of claim 13, wherein the social advertisement comprises one or more social stories included with the advertisement.

22. The method of claim 13, wherein the social story includes interaction information of one or more users associated with the viewing user who has interacted with the one or more identified objects.

23. A computer program product comprising a non-transitory computer readable storage medium having instructions encoded thereon that, when executed by a processor, cause the processor to perform steps comprising:
   receiving a plurality of advertisement requests, each advertising request comprising advertising content and an identification of one or more objects in a social networking system;
   identifying a viewing user to receive advertising;
   identifying one or more other users who are connected to the viewing user in the social networking system;
   identifying a plurality of objects in the social networking system with which the identified one or more other users have interacted;
   identifying one or more candidate advertisements based on the advertisement requests, where each candidate advertisement is associated with an advertisement request that identified at least one of the identified objects with which the identified one or more other users have interacted;
   selecting a candidate advertisement for display to the viewing user;
   generating by a processor a social advertisement that comprises (1) the advertising content for the advertisement request associated with the selected candidate advertisement and (2) a social story that describes an interaction between a user who is connected with the viewing user and an object in the social networking system; and
   sending the social advertisement for display to the viewing user.

24. The computer program product of claim 23, wherein the viewing user is identified responsive to the viewing user requesting content with which an advertisement is to be served.

25. The computer program product of claim 23, wherein at least one of the advertising requests explicitly identifies one or more objects in a social networking system.

26. The computer program product of claim 23, wherein at least one of the advertising requests inherently identifies one or more objects in a social networking system, and wherein the method further comprises identifying one or more objects in the social networking system based on the advertising content.

27. The computer program product of claim 23, further comprising:
   generating an index for each of at least some of the users with who the viewing user is connected, the index mapping each user to one or more objects with which the users have interacted; and
   using the index to identify a plurality of objects in the social networking system with which one or more other users have interacted.

28. The computer program product of claim 23, wherein selecting the candidate advertisement comprises:
   ranking the plurality of objects based on the number of interactions by the identified other users who are connected to the viewing user;
   ranking the candidate advertisements based on the number of interactions with each of their associated objects; and
   selecting the candidate advertisement based on the ranking.

29. The computer program product of claim 28, wherein selecting the candidate advertisement comprises ranking the plurality of objects based on the type of interactions between the identified other users who are connected to the view user and the plurality of objects.

30. The computer program product of claim 23, wherein generating a social advertisement comprises:
   selecting an object from a plurality of objects associated with the advertisement request for the selected candidate advertisement; and
   composing the social story based on the selected object.

31. The computer program product of claim 23, wherein generating a social advertisement comprises:
   selecting a user from a plurality of other users who have interacted with an object identified by the advertisement request for the selected candidate advertisement; and
   composing the social story based on the selected user.

32. The computer program product of claim 23, wherein the generated social advertisement is provided to the viewing user responsive to the viewing user requesting a social networking content.

33. The computer program product of claim 23, wherein the social advertisement comprises one or more social stories included with the advertisement.

34. The computer program product of claim 23, wherein the social story includes interaction information of one or more users associated with the viewing user who has interacted with the one or more identified objects.

35. A computer program product comprising a non-transitory computer readable storage medium having instructions encoded thereon that, when executed by a processor, cause the processor to perform steps comprising:
   accessing a database of advertisements, each advertisement associated with targeting criteria that specifies targeting the advertisement to a user who is connected in a social networking system to another user who has interacted with a particular object in the social networking system;
   identifying a viewing user to receive advertising;
   identifying one or more other users who are connected to the viewing user in the social networking system;
   identifying one or more candidate advertisements from the database of advertisements using the targeting criteria;

selecting an advertisement from the candidate advertisements for display to the viewing user;

generating by a processor a social story based on an interaction between a user from the identified one or more other users who are connected to the viewing user and the particular object in the social networking system; and sending the selected advertisement and the social story for display to the viewing user.

36. The computer program product of claim 35, wherein the viewing user is identified responsive to the viewing user requesting content with which an advertisement is to be served.

37. The computer program product of claim 35, further comprising:

generating an index for each of at least some of the users with who the viewing user is connected, the index mapping each user to one or more objects with which the users have interacted; and using the index to identify a plurality of objects in the social networking system with which one or more other users have interacted.

38. The computer program product of claim 35, wherein identifying the candidate advertisement comprises:

ranking the plurality of objects based on the number of interactions by the identified other users who are connected to the viewing user;

ranking the candidate advertisements based on the number of interactions with each of their associated objects; and selecting the candidate advertisement based on the ranking.

39. The computer program product of claim 38, wherein identifying the candidate advertisement comprises ranking the plurality of objects based on the type of interactions between the identified other users who are connected to the view user and the plurality of objects.

40. The computer program product of claim 35, wherein generating a social advertisement comprises:

selecting an object from a plurality of objects associated with the advertisement request for the selected candidate advertisement; and composing the social story based on the selected object.

41. The computer program product of claim 35, wherein generating a social advertisement comprises:

selecting a user from a plurality of other users who have interacted with an object identified by the advertisement request for the selected candidate advertisement; and composing the social story based on the selected user.

42. The computer program product of claim 35, wherein the generated social advertisement is provided to the viewing user responsive to the viewing user requesting a social networking content.

43. The computer program product of claim 35, wherein the social advertisement comprises one or more social stories included with the advertisement.

44. The computer program product of claim 35, wherein the social story includes interaction information of one or more users associated with the viewing user who has interacted with the one or more identified objects.

* * * * *